United States Patent [19]

Rendina et al.

[11] Patent Number: 4,925,899

[45] Date of Patent: May 15, 1990

[54] BIMODAL STAR-BLOCK COPOLYMERS, SHOWING EXCELLENT OPTICAL PROPERTIES AND RESILIENCE, AND PROCESS FOR THEIR MANUFACTURE

[75] Inventors: Gabriele Rendina, Torino; Roberto Nocci, Novara; Andrea Callaioli, Mantova; Francesco Corrado, Novara, all of Italy

[73] Assignee: Montedipe S.p.A., Milan, Italy

[21] Appl. No.: 214,831

[22] Filed: Jul. 1, 1988

Related U.S. Application Data

[63] Continuation of Ser. No. 72,396, Jul. 13, 1987.

[30] Foreign Application Priority Data

Jul. 17, 1986 [IT] Italy .................... 21165 A/86

[51] Int. Cl.$^5$ .................... C08F 297/04; C08F 297/02
[52] U.S. Cl. .................... 525/314; 525/250; 525/271
[58] Field of Search .................... 525/250, 271, 314

[56] References Cited

U.S. PATENT DOCUMENTS

| | | | |
|---|---|---|---|
| 4,167,545 | 9/1979 | Fahrbach et al. | 525/314 |
| 4,221,884 | 9/1980 | Bi et al. | 525/314 |
| 4,248,982 | 2/1981 | Bi et al. | 525/250 |
| 4,418,180 | 11/1983 | Heinz et al. | 525/250 |

Primary Examiner—Wilbert J. Briggs, Sr.
Attorney, Agent, or Firm—Stevens, Davis, Miller & Mosher

[57] ABSTRACT

Bimodal star-block copolymers are disclosed containing from 60 to 90% by weight of an aromatic vinyl monomer and from 40 to 10% by weight of a conjugated diene, said copolymers having the general formula:

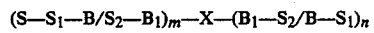

$$(S-S_1-B/S_2-B_1)_m-X-(B_1-S_2/B-S_1)_n$$

wherein X is a polyfunctional radical, m and n are integers (being m≦n) the sum of which is between 3 and 20 and equal to the functionality degree of the radical X, S and $S_1$ are polymer blocks of an aromatic vinyl monomer, $B_1$ is an elastomeric copolymer of conjugated dienic units, containing up to 20% of all the dienic units of the copolymer, and $B/S_2$ and $S_2/B$ are blocks of copolymers of aromatic vinyl monomer and conjugated diene of the random and/or tapered type.

10 Claims, No Drawings

BIMODAL STAR-BLOCK COPOLYMERS, SHOWING EXCELLENT OPTICAL PROPERTIES AND RESILIENCE, AND PROCESS FOR THEIR MANUFACTURE

This application is a Continuation of application Ser. No. 072,396, filed July 13, 1987, now abandoned.

BACKGROUND OF THE INVENTION

Bimodal star-block copolymers are well known in the field of anionic polymerization. These copolymers are generally prepared forming first a linear block-copolymer bearing active lithium atoms on one end of the chain; these linear (active) polymeric chains are then coupled, by addition of a polyfunctional compound having at least three reactive sites able to react with the C—Li bond of each polymeric chain, by coupling the polymeric chains to the functional groups of said compound.

U.S. Pat. No. 3,280,084 discloses the polymerization of butadiene with buthyl-lithium as initiator to form blocks of polybutadiene ending with lithium, which (after having been coupled with divinyl-benzene) gives rise to star copolymers having a poly-divinyl-benzene nucleus and several identical polybutadiene arms departing therefrom; these arms can be styrene-butadiene copolymers of the "random" or "block" type.

U.S. Pat. No. 3,639,517 discloses star-block copolymers where the side arms attached to the same nucleus have a different molecular weight.

These arms are formed by using differential additions of styrene monomer and of initiator to give S—Li, $S_1$—Li and $S_2$—Li, where S, $S_1$ and $S_2$ are polystyrene blocks having a different molecular weight, then adding butadiene and finally coupling these arms to give star-block copolymers having a bi-, tri and poly-modal distribution of the molecular weight.

U.S. Pat. No. 4,086,298 discloses star-block copolymers having a mixture of arms, some of which are formed by polymerizing styrene with alkyl-lithium to form polymeric S—Li blocks and then adding a styrene-butadiene mixture to form a "tapered" polymer represented by S—B→$S_1$, wherein the arrow represents a "tapered" segment. Other arms consist of one single butadiene-styrene tapered copolymer segment (B—$S_1$).

U.S. Pat. No. 4,221,884 describes star and bimodal block copolymers, that are transparent and impact resistant, expecially at the low temperature, such as between −20° and −40° C., having general formula:

$$(S—S'/B—B')_m—X—(B'—B/S')_n \quad (I)$$

where S is a non elastomeric block of 80–95% by weight of the total mono-vinyl aromatic compound, S'/B or B/S' is a block copolymer of "random" and/or "tapered" type of the mono-vinyl aromatic compound and of the conjugated diene, wherein the S'/B weight ratio is lower than 1, B' is an elastomeric segment of conjugated polydiene, containing 20–40% by weight of the total conjugated diene, m and n are integers comprised between 3 and 20 and X is the radical of a polyfunctional coupling agent forming the nucleus of the star-block copolymer. These star-block copolymers, although endowed with very good high impact features, are not wholly satisfactory as to their optical properties.

The Applicant has now obtained bimodal star-block copolymers having excellent optical features, combined with satisfactory high impact features, by introducing in the copolymer a structural modification and reducing the amount of conjugated diene in the B' segment of the general formula (I).

DISCLOSURE OF THE INVENTION

In its broadest aspect, the invention concerns bimodal star-block copolymers containing from 60 to 90% by weight of recurring units of mono-vinyl aromatic monomer and from 40 to 10% by weight of recurring units of conjugated diene, having formula:

$$(S—S_1—B/S_2—B_1)_m—X—(B_1—S_2/B—s_1)_n \quad (II)$$

wherein X is a polyfunctional radical, m and n are integers (being m≦n) the sum of which is between 3 and 20 and equal to the functionality degree of the radical X, S and $S_1$ are polymer blocks of an aromatic vinyl monomer, $B_1$ is an elastomeric copolymer of conjugated dienic units, containing up to 20% of all the dienic units of the copolymer, and $B/S_2$ and $S_2/B$ are blocks of the "random" and/or "tapered" type of the mono-vinyl aromatic compound and of the conjugated diene.

The "bimodal" adjective, as it is used in the present description and claims, indicates a copolymer containing two types of polymeric chains of different lenght between them, respectively indicated by S—$S_1$—B/$S_2$—$B_1$ and $S_1$—B/$S_2$—$B_1$.

According to a preferred embodiment of the invention, styrene blocks S contain a number of units from 3 to 7 times higher than blocks $S_1$ and the sum $S_1+S_2$ contains from 50 to 80% of all the styrene units of the copolymer.

$B/S_2$ and $S_2/B$ blocks own a $S_2$:B weight ratio comprised between 0.8 and 1.2, and preferably equal to 1.

Furthermore, we particularly prefer those products, where the ratio of the molecular weight of S to the molecular weight of $B/S_2$ is higher than 1, such as between 1.2 and 6 and preferably between 1.5 and 3.

The amount of conjugated diene units contained in the elastomeric ($B_1$) block is generally lower than 20% of all the dienic units contained in the copolymer and is preferably comprised between 1 and 10%.

The copolymers according to the invention are thermoplastic, wholly transparent, highly resilient, that is impact-resistant and show excellent optical properties.

The invention relates also to a multi-stage process for the manifacture of the new copolymers.

In a first step, 20–50% by weight of the total amount of the mono-vinyl aromatic monomer is anionically polymerized, in an inert solvent and in the presence of an organo-metallic lithium catalyst (initiator), in order to form living linear polymeric blocks bearing lithium ions at the end of the chain. The polymerization is then continued until completion.

In a second step, a further amount of initiator is added and then a second amount of mono-vinyl aromatic monomer is added, so as to form S—$S_1$—Li and $S_1$—Li polymeric blocks.

In a third step, a mixture containing all the remaining mono-vinyl aromatic monomer and an amount of conjugated diene at least corresponding to 80% of the total diene is continuously added; in this third step, the polymeric blocks of the RANDOM and/or TAPERED type (B/$S_2$) are formed.

In a fourth step, all the remaining conjugated diene is added and it is allowed to react until complete conversion, to form a block of polydiene on each of the blocks of the third step. Thus, the mixture contains S—$S_1$B/$S_2$—Li and $S_1$—B/$S_2$—$B_1$—Li blocks.

In a fifth step, the polifunctional coupling agent is added, which couples S—$S_1$—B/$S_2$—$B_1$—Li and $S_1$—B/$S_2$—$B_1$—Li blocks, to give the star-block copolymers of formula (II).

As an initiator, the generally used lithium alkyl, cycloalkyl or aryl compounds can be used, such as for instance methyl-lithium, n-butyl-lithium, sec-butyllithium, cyclohexyl-lithium, phenyl-lithium, p-tolylltihium and naphthyl-lithium. The amount is generally comprised between 0.2 and 20 millimols per mole of monomer, in the first and second stage. The amount of initiator, in the second stage, is at least in a 1:1 ratio (and preferably the treble) to the amount of the preceding step.

As a polyfunctional coupling agent, any compound can be used having functional groups able to react with lithium-carbonium bonds, in order to link the carbon atom chain to the polyfunctional group. Typical examples of polyfunctional coupling agents are the polyepoxides, such as for instance the epoxidized polybutadiene, the epoxidized soia-bean oil, the epoxidized linseed oil, polyesters such as diethyl-adipate, polihalides such as silicon tetrachloride; polyisocyanates such as 1,2,4-benzene-triisocyanate; polyimines; polyaldehydes, polyetones; polyanhydrides such as pyromellitic dianhydride; polyacid halides, such as mellitic acid chloride and so on; poly-vinyl-aromatic compounds, such as divinyl-benzene, can be also used as coupling agents; divinyl-benzene polymerizes, forming in situ polyfunctional coupling agents. The coupling must be followed by a termination, generally with methanol, water or carbon dioxide.

Type and amount of coupling agent are depending on the number of polymeric chains containing the lithium ended ends and on the number of desired arms for each star-block molecule.

Thus, in the case of a for coupling agent having a fixed number of functional groups (such as for instance silicon tetrachloride), an equivalent amount of coupling agent (per each equivalent amount of lithium-ended polymeric chains), gives rise to a 4-arm star-block copolymer. In the a case of difunctional agent, which polymerizes during the coupling reaction, such as for instance divinyl-benzene, the amount of coupling agent to be used is determined by the reaction conditions (the number of equivalent functional sites being variable).

The most suitable monovinyl-aromatic compound, (for the manufacture of the copolymers of the invention) is styrene; an alkyl substituted styrene having the same copolymerization properties, such as for instance methyl-styrenes, ethyl-styrenes, t.-butyl-styrenes etc., can also be used.

Conjugated dienes useful for preparing the copolymers of the invention are those having from 4 to 8 C atoms in the molecule, such as for instance 1,3-butadiene isoprene, 2,3-dimethyl-1,3-butadiene, piperylene and mixture thereof.

Lithium-organic initiators which may be used are the well-known lithium-alkyl compound such as methyllithium, n.-buthyl-lithium, sec.-buthyl-lithium, lithium-cyclo-alkyl compounds such as cyclohexyl-lithium and the aryl-lithium compounds such as phenyl-lithium, p-tolyl-lithium, napththyl-lithium and so on.

The amount of initiator is comprised between 0.2 and 20 millimols per each mol of the monomer in each step of the process. Each step can require an amount of initiator equal to or higher than that of the preceding stage. The total amount of initiator depends on the molecular weight and on the number of the desired polymeric chains of each type.

The polymerization can be carried out in an inert hydrocarbon solvent such as isobutane, pentane, hexane, cyclo-hexane, benzene, toluene, xylene and the like. The polymerization can be carried out in the absence of air, moisture or other impurities, which, as it is well-known, impair the anionic catalytic system. The polymerization temperature can be kept between 0 and 120° C., preferably between 40 and 80° C.

The following examples illustrate the invention without limiting in any way the scope thereof.

EXAMPLE 1

Into a 5 liter glass reaction vessel, kept at a constant temperature under nitrogen atmosphere and equipped with a stirrer, there were loaded 2800 cm$^3$ of cyclohexane and 0.5 cm$^3$ of styrene; the mixture was then titrated with sec.-butyl-lithium in cyclohexane (to remove impurities).

The temperature was raised up to 50° C. and 3.6 millimols of sec.-butyl-lithium were added, dissolved in 7 cm$^3$ of cyclohexane. 150 g of styrene were then loaded and the anionic polymerization was allowed to proceed for 30 minutes keeping the temperature below 60° C.

The analysis of a sample showed a viscosimeter average molecular weight 41,000. At this point further 11.4 millimols of sec.-butyl-lithium (dissolved in 21 cm$^3$ of cyclohexane) and further 150 g of styrene were added.

The polymerization went on for further 30 minutes, always keeping the temperature below 60° C. and thereafter 150 g of styrene and 150 g of butadiene were contemporarily and continuously fed within 90 minutes.

The polymerization went on at about 60° C. for 20 minutes and then the colour of the reaction mixture changed from yellow (the typical color of butadiene-lithium ending blocks) to orange (the typical colour of styrene-lithium ending blocks). The polymerization then continued for further 30 minutes, without any change to colour; 2 g of butadiene were then added by continuing the polymerization for 20 minutes always at 60° C.

At this point 1.9 g of epoxidized soia-bean oil, known on the market as ESTABEX 2307, were added. The reaction mixture was heated at 78° C. for 15 minutes and the polymer was separated by precipitation in methanol. The thus obtained copolymer was stabilized by adding 3 g of 2,6-di ter.-butyl-paracresol and 3 g of tri-isodecyl phosphite.

600 g of the obtained product were analyzed and resulted to own about 3 linear arms, showing a bimodal distribution in the molecular weight before coupling. Polystyrene longest blocks (S) had a molecular weight of about 50,000; shortest polystyrene blocks ($S_1$) had a molecular weight of 10,000; the styrene/butadiene (B/$S_2$) random copolymers had a molecular weight of 20,000 and the polybutadiene $B_1$ blocks a molecular weight of 1,000.

Average molecular weights were determined by "Gel-Permeation" chromatography, using polystyrene as a standard.

The average composition of the obtained star-block copolymer obtained was as follows:

75% by weight styrene, 67% of which as polystyrene (S+S$_1$) blocks and 33% in the styrene/butadiene (B/S$_2$) copolymer blocks;
25% by weight of butadiene.

EXAMPLE 2

Example 1 was repeated, replacing the epoxidized soia-bean oil by a coupling agent consisting of 15.2 millimols of divinylbenzene (mixture of isomers); coupling occurred within 1 h at 50° C. The reaction was completed using 10 cm$^3$ of water, saturated with carbon dioxide. The star copolymer was separated and stabilized as in example 1; the features of the copolymer are reported in table 1.

EXAMPLE 3

Example 1 was repeated by replacing the epoxidized soia-bean oil by 2.8 g of epoxidized linseed oil, known on the market as EDENOL B-316; the features of the thus obtained product are recorded on Table 1.

TABLE 1

| FEATURE | METHOD | UNIT | EXAMPLE 1 | EXAMPLE 2 | EXAMPLE 3 |
|---|---|---|---|---|---|
| Inherent viscosity* | | dl/g | 0.60 | 0.53 | 0.55 |
| Tensile modulus | ASTM D638 | MPa | 1,100 | 1,100 | 620 |
| Yield point under tensile stress | ASTM D638 | MPa | 19.6 | 23.2 | 14.4 |
| Yield point elongation under tensile stress | ASTM D638 | % | 6 | 6 | 7 |
| Break point | ASTM D638 | MPa | 12 | 12.8 | 9.3 |
| Break elongation | ASTM D638 | % | 250 | 250 | 250 |
| Flexural stress | ASTM D790 | MPa | 29 | 34.9 | 20.4 |
| Flexural deformation | ASTM D790 | % | 4.6 | 4.4 | 4.9 |
| Flexural modulus | ASTM D790 | MPa | 920 | 1,100 | 620 |
| Haze | ASTM D1003-61 | % | 4 | 3 | 5 |
| Cloud Point | | °C. | 280 | 290 | 275 |
| Melt flow index | ASTM D1238 at 200° C. at 5,000 g | g/10' | 20 | 30 | 25 |

*Measured at 30° C. in toluene; concentration = 2.5 g/l
**Determined according to O. OLABISI, L. M. ROBENSON, M. T. SHAW "Polymer-Polymer Miscibility" Academic Press, 1979, page 1491.

What we claim is:

1. Bimodal star-block copolymers, containing from 60 to 90% by weight of recurring units of monovinyl aromatic monomer and from 40 to 10% by weight of recurring units of conjugated diene, having the formula:

$$(S—S_1—B/S_2—B_1)_m—X—(B_1—S_2/B—S_1)_n \quad (II)$$

wherein X is a polyfunctional radical, m and n are such that (with m≦n) the sum of m+n is between 3 and 20 and is equal to the functionality degree of radical X, S and S$_1$ are polymer blocks of mono-vinyl aromatic monomer, B$_1$ is a block of conjugated dienic units of the copolymer, B/S$_2$ and S$_2$/B are copolymer blocks of the random and/or tapered type of the mono-vinyl aromatic compound and of the conjugated diene, the weight ratio of S$_2$ to B and B to S$_2$ being between 0.8 and 1.2, the sum of the units of aromatic vinylmonomer in blocks S and S$_1$ being 50 to 80% of all the vinylaromatic units in the copolymer.

2. Bimodal star-block copolymers according to claim 1 wherein the aromatic vinyl monomer blocks S contain a number of units which is from 3 to 7 times higher than the one of the S$_1$ blocks.

3. Bimodal star-block copolymers according to claim 1, wherein B/S$_2$ and S$_2$/B blocks show a S$_2$:B weight ratio equal to about 1.

4. Bimodal and star-blocked copolymers, according to claim 1, wherein the ratio between the molecular weight of S and the molecular weight of B/S$_2$ is higher than 1.

5. Bimodal star-block copolymers according to claim 4, wherein the ratio between the molecular weight of S and the molecular weight of B/S$_2$ is between 1.2 and 6.

6. Bimodal star-block copolymers according to claim 1, wherein the coupling agent is selected from polyepoxides, epoxidized soia-bean oil, epoxidized linseed oil, polyesters, polyhalides, [polyanhydrides, polyisocyanates, poly-imines, polyaldehydes, polyketones, polyanhydrides, polyacid halides and poly-vinyl aromatic compounds.

7. Bimodal star-block copolymers according to claim 1, wherein the mono-vinyl aromatic monomer is styrene.

8. Bimodal star-block copolymers according to claim 1, wherein the conjugated diene has from 4 to 8 carbon atoms.

9. Bimodal star-block copolymers according to claim 1, wherein the ratio between the molecular weight of S and the molecular weight of B/S$_2$ is between 1.5 and 3.

10. Bimodal star-block copolymers according to claim 1, wherein the diene is 1,3-butadiene.

* * * * *